(12) United States Patent
Wang et al.

(10) Patent No.: US 6,590,305 B2
(45) Date of Patent: Jul. 8, 2003

(54) HIGH TEMPERATURE SUPER-CONDUCTING SYNCHRONOUS ROTOR HAVING AN ELECTROMAGNETIC SHIELD AND METHOD FOR ASSEMBLY

(75) Inventors: Yu Wang, Clifton Park, NY (US); Robert John Nygard, Saratoga Springs, NY (US); Evangelos Trifon Laskaris, Schenectady, NY (US); John Arthur Urbahn, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 09/854,938

(22) Filed: May 15, 2001

(65) Prior Publication Data

US 2002/0171320 A1 Nov. 21, 2002

(51) Int. Cl.[7] .................................................. H02K 9/00
(52) U.S. Cl. .............................. 310/54; 310/52; 310/261
(58) Field of Search ............................ 310/54, 52, 58, 310/61, 60 A, 261, 269, 271, 262

(56) References Cited

U.S. PATENT DOCUMENTS 4,176,291 A  * 11/1979  Rabinowitz ................. 310/52
5,532,663 A     7/1996  Herd et al.
5,548,168 A     8/1996  Laskaris et al.
5,672,921 A     9/1997  Herd et al.
5,774,032 A     6/1998  Herd et al.
5,777,420 A     7/1998  Gamble et al.
5,798,678 A     8/1998  Manlief et al.
5,953,224 A     9/1999  Gold et al.
6,066,906 A     5/2000  Kalsi
6,140,719 A    10/2000  Kalsi
6,169,353 B1    1/2001  Driscoll et al.
6,173,577 B1    1/2001  Gold
2002/0125787 A1 9/2002  Howard et al.
2003/0011253 A1 1/2003  Kalsi et al.
2003/0011273 A1 1/2003  Kalsi et al.
2003/0011452 A1 1/2003  Snitchler et al.

OTHER PUBLICATIONS

Fast, Reactive Power Support, *HTS Generators*, American Superconductor™ (Feb. 27, 2001) pp.1–4.

* cited by examiner

*Primary Examiner*—Thanh Lam
(74) *Attorney, Agent, or Firm*—Nixon & Vanderhye P.C.

(57) ABSTRACT

A rotor is disclosed for a synchronous machine comprising: a rotor core; a super-conducting coil winding extending around at least a portion of the rotor core, the coil winding having a pair of side sections on opposite sides of the rotor core; and a conductive shield around the rotor core and covering the coil winding.

11 Claims, 8 Drawing Sheets

HIGH TEMPERATURE SUPER-CONDUCTING SYNCHRONOUS ROTOR HAVING AN ELECTROMAGNETIC SHIELD AND METHOD FOR ASSEMBLY

RELATED APPLICATIONS

This application is related to the following commonly-owned and commonly-filed applications (the specifications and drawings of each are incorporated by reference herein):

U.S. patent application Ser. No. 09/854,933 entitled "High Temperature Super-Conducting Rotor Coil Support With Split Coil Housing And Assembly Method", filed May 15, 2001 (atty. dkt. 839-1006);

U.S. patent application Ser. No. 09/854,931 entitled "Synchronous Machine Having Cryogenic Gas Transfer Coupling To Rotor With Super-Conducting Coils", filed May 15, 2001 (atty. dkt. 839-1007);

U.S. patent application Ser. No. 09/855,026 entitled "High Temperature Super-Conducting Synchronous Rotor Coil Support With Tension Rods And Method For Assembly Of Coil Support", filed May 15, 2001 (atty. dkt. 839-1008);

U.S. patent application Ser. No. 09/854,946 entitled "High Temperature Super-Conducting Rotor Coil Support With Tension Rods And Bolts And Assembly Method", filed May 15, 2001 (atty. dkt. 839-1009);

U.S. patent application Ser. No. 09/854,939 entitled "High Temperature Super-Conducting Coils Supported By An Iron Core Rotor", filed May 15, 2001 (atty. dkt. 839-1010);

U.S. patent application Ser. No. 09/854,940 entitled "High Temperature Super-Conducting Rotor Coil Support And Coil Support Method", filed May 15, 2001 (atty. dkt. 839-1012);

U.S. patent application Ser. No. 09/854,937 entitled "High Temperature Super-Conducting Rotor Having A Vacuum Vessel And Electromagnetic Shield And Method For Assembly", filed May 15, 2001 (atty. dkt. 839-1016);

U.S. patent application Ser. No. 09/854,944 entitled "A High Power Density Super-Conducting Electric Machine", filed May 15, 2001 (atty. dkt. 839-1019);

U.S. patent application Ser. No. 09/854,943 entitled "Cryogenic Cooling System For Rotor Having A High Temperature Super-Conducting Field Winding", filed May 15, 2001 (atty. dkt. 839-1062);

U.S. patent application Ser. No. 09/854,464 entitled "High Temperature Super-Conducting Racetrack Coil", filed May 15, 2001 (atty. dkt. 839-1063); and U.S. patent application Ser. No. 09/855,034 entitled "High Temperature Super Conducting Rotor Power Leads", filed May 15, 2001 (atty. dkt. 839-1064).

BACKGROUND OF THE INVENTION

The present invention relates generally to a super-conductive coil in a synchronous rotating machine. More particularly, the present invention relates to an electromagnetic shield for a rotor having super-conducting field windings.

Synchronous electrical machines having field coil windings include, but are not limited to, rotary generators, rotary motors, and linear motors. These machines generally comprise a stator and rotor that are electromagnetically coupled. The rotor may include a multi-pole rotor core and one or more coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at an air-gap magnetic field strength of about 2 Tesla. Known super-conductive rotors employ air-core designs, with no iron in the rotor, to achieve air-gap magnetic fields of 3 Tesla or higher. These high air-gap magnetic fields yield increased power densities of the electrical machine, and result in significant reduction in weight and size of the machine. Air-core super-conductive rotors require large amounts of super-conducting wire. The large amounts of SC wire add to the number of coils required, the complexity of the coil supports, and the cost of the SC coil windings and rotor.

High temperature SC coil field windings are formed of super-conducting materials that are brittle, and must be cooled to a temperature at or below a critical temperature, e.g., 27° K., to achieve and maintain super-conductivity. The SC windings may be formed of a high temperature super-conducting material, such as a BSCCO ($Bi_xSr_xCa_xCu_xO_x$) based conductor.

Super-conducting coils have been cooled by liquid helium. After passing through the windings of the rotor, the hot, used helium is returned as room-temperature gaseous helium. Using liquid helium for cryogenic cooling requires continuous reliquefaction of the returned, room-temperature gaseous helium, and such reliquefaction poses significant reliability problems and requires significant auxiliary power.

Prior SC coil cooling techniques include cooling an epoxy-impregnated SC coil through a solid conduction path from a cryocooler. Alternatively, cooling tubes in the rotor may convey a liquid and/or gaseous cryogen to a porous SC coil winding that is immersed in the flow of the liquid and/or gaseous cryogen. However, immersion cooling requires the entire field winding and rotor structure to be at cryogenic temperature, as a result no iron can be used in the rotor magnetic circuit because of the brittle nature of iron at cryogenic temperatures.

What is needed is a super-conducting field winding assemblage for an electrical machine that does not have the disadvantages of the air-core and liquid-cooled super-conducting field winding assemblages of, for example, known super-conductive rotors.

In addition, high temperature super-conducting (HTS) coils are sensitive to degradation from high bending and tensile strains. These coils must undergo substantial centrifugal forces that stress and strain the coil windings. Normal operation of electrical machines involves thousands of start up and shut down cycles over the course of several years that result in low cycle fatigue loading of the rotor. Furthermore, the HTS rotor winding should be capable of withstanding 25% over-speed operation during rotor balancing procedures at ambient temperature and notwithstanding occasional over-speed conditions at cryogenic temperatures during power generation operation. These over-speed conditions substantially increase the centrifugal force loading on the windings over normal operating conditions.

SC coils used as the HTS rotor field winding of an electrical machine are subjected to stresses and strains during cool-down and normal operation. They are subjected to centrifugal loading, torque transmission, and transient fault conditions. To withstand the forces, stresses, strains and cyclical loading, the SC coils should be properly supported in the rotor by a coil support system. These support systems hold the SC coil(s) in the HTS rotor and secure the coils against the tremendous centrifugal forces due to the rotation of the rotor. Moreover, the coil support system protects the SC coils, and ensures that the coils do not prematurely crack, fatigue or otherwise break.

Developing support systems for HTS coil has been a difficult challenge in adapting SC coils to HTS rotors. Examples of coil support systems for HTS rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a HTS rotor having a coil support system for a SC coil. The need also exists for a coil support system made with low cost and easy to fabricate components.

BRIEF SUMMARY OF THE INVENTION

Structural supports for the HTS field coil windings has been one of the primary challenges to incorporating SC coils into rotors. The structure must support the SC coil winding without conducting substantial heat into the winding. The structure of the coil support has been minimized so as to reduce the mass that conducts heat from the rotor core into the cooled SC windings. However, minimizing the coil supports also limits the level of forces that can be withstood by the supports. If the forces that act on the rotor exceed the force carrying ability of the coil supports, then there is a substantial risk that the coil support will fail or that the coil windings will be damaged.

A potential source of forces that act on the rotor is torque due to grid faults. A High Temperature Super-Conducting (HTS) generator has a field winding SC coil is susceptible to electrical grid faults. A grid fault is a current spike in the power system grid to which is coupled the stator of the machine. Under grid fault conditions excessive current flows in the stator. This current causes an electrical disturbance in the stator winding that induces a strong transient magnetic flux into the rotor field winding coils.

The potential penetration of a transient magnetic field into the rotor field winding coil creates significant torque forces on the rotor coil winding and induces hysteresis and eddy current heating (alternating current loses) in the super-conducting field winding that my result in loss of super-conductivity. In addition, reducing these extraneous magnetic field penetrations will reduce alternating current (AC) loses in the super-conductor and preserve the super-conducting state of the rotor field winding. Minimizing the forces that act on a rotor allows for reduction in the structure of the coil support system. Reducing the rotor torque due to grid faults and other extraordinary variations in the electro-magnetic field surrounding the rotor allows the coil support structures to be minimized.

Shielding the rotor prevents magnetic flux from the stator from interfering with the rotor. If a rotor field winding coil is not well shielded, the coil support must be reinforced to support the fault torque. An electromagnetic (EM) shield prevents stator magnetic flux from penetrating the rotor, which is more important for a super-conducting machine than a conventional machine.

The EM shield may cover nearly the entire surface of the rotor core. A cylindrical shield shape is useful for providing EM protection to the rotor. The EM shield may also served as the vacuum boundary for the SC coils. This boundary establishes a vacuum around the SC coil winding. The EM shield may be made of highly electrical conducted material, such as copper or aluminum.

The HTS rotor may be for a synchronous machine originally designed to include SC coils. Alternatively, the HTS rotor may replace a copper coil rotor in an existing electrical machine, such as in a conventional generator. The rotor and its SC coils are described here in the context of a generator, but the HTS coil rotor is also suitable for use in other synchronous machines.

The coil support system is useful in integrating the coil support system with the coil and rotor. In addition, the coil support system facilitates easy pre-assembly of the coil support system, coil and rotor core prior to final rotor assembly. Pre-assembly reduces coil and rotor assembly time, improves coil support quality, and reduces coil assembly variations.

In a first embodiment, the invention is a rotor in a synchronous machine comprising: a rotor core; a super-conducting coil winding extending around at least a portion of the rotor core, said coil winding having a pair of side sections on opposite sides of said rotor core; and a conductive shield around the rotor core and covering said coil winding.

In another embodiment, the invention is a method for shielding a super-conducting coil winding on a rotor core of a synchronous machine comprising the steps of: assembling the coil winding and rotor core; attaching ends of the core to collars of end shafts coaxially aligned with the core, and installing a conductive shield around the rotor core, wherein the shield overlaps each of the collars.

Another embodiment of the invention is a rotor for a synchronous machine comprising: a rotor core having a conduit orthogonal to a longitudinal axis of the rotor; a race-track super-conducting (SC) coil winding in a planar race-track shape parallel to the longitudinal axis of the rotor; a tension rod inside the conduit of the core; a housing coupling the coil winding to the tension rod, and a electro-magnetic shield around the rotor core.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
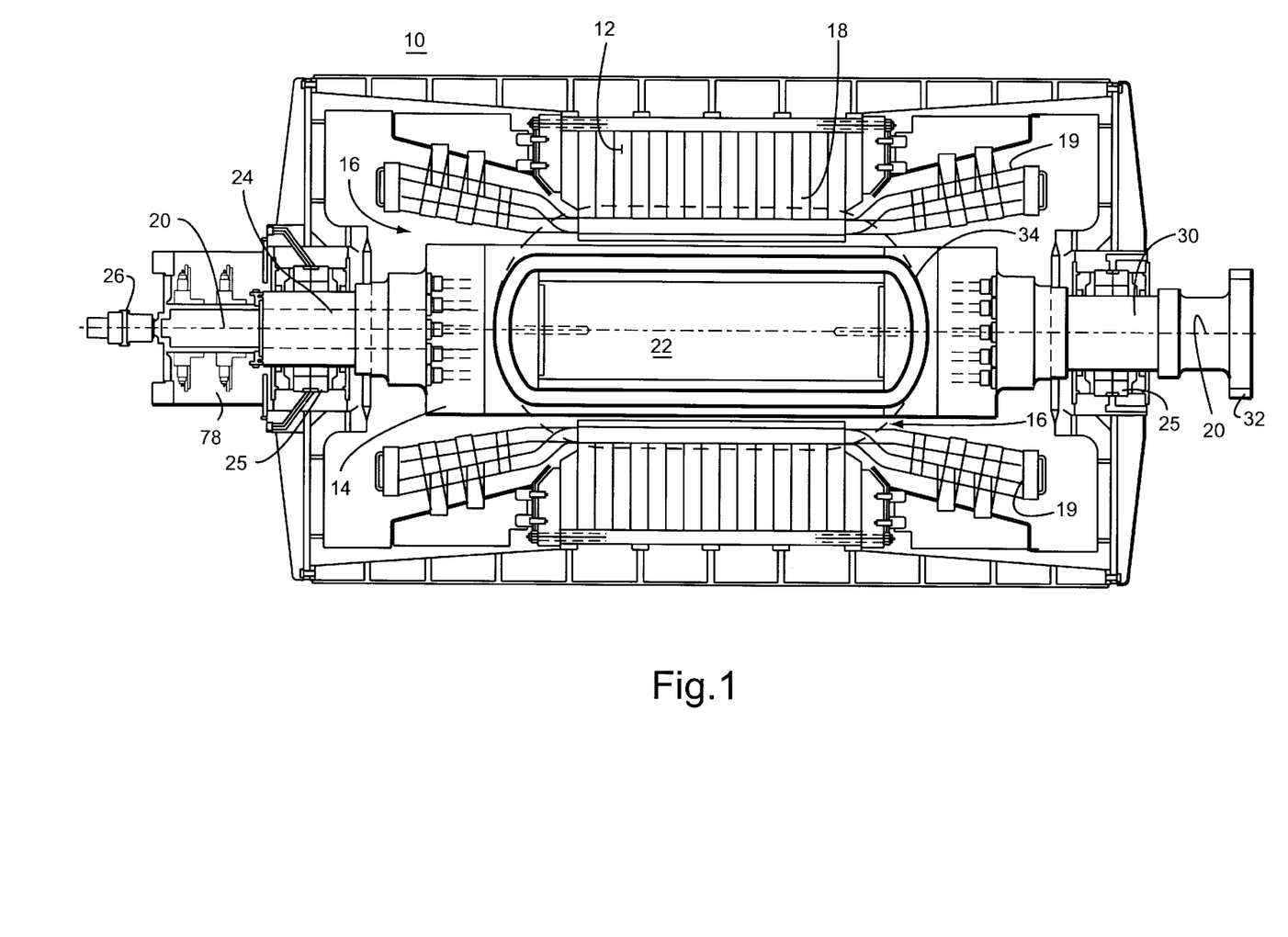
FIG. 1 is a schematic side elevational view of a synchronous electrical machine having a super-conductive rotor and a stator.

FIG. 1 shows an exemplary synchronous generator machine 10 having a stator 12 and a rotor 14. The rotor includes field winding coils that fit inside the cylindrical rotor vacuum cavity 16 of the stator. The rotor fits inside the rotor vacuum cavity of the stator. As the rotor turns within the stator, a magnetic field 18 (illustrated by dotted lines) generated by the rotor and rotor coils moves/rotates through the stator and creates an electrical current in the windings of the stator coils 19. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a low power density super-conducting machine, the iron core of the rotor is used to reduce the magnetomotive force (MMF), and, thus, minimize the amount of super-conducting (SC) coil wire needed for the coil winding. For example, the solid iron-rotor core may be magnetically saturated at an air-gap magnetic field strength of about 2 Tesla.

Figure 2:
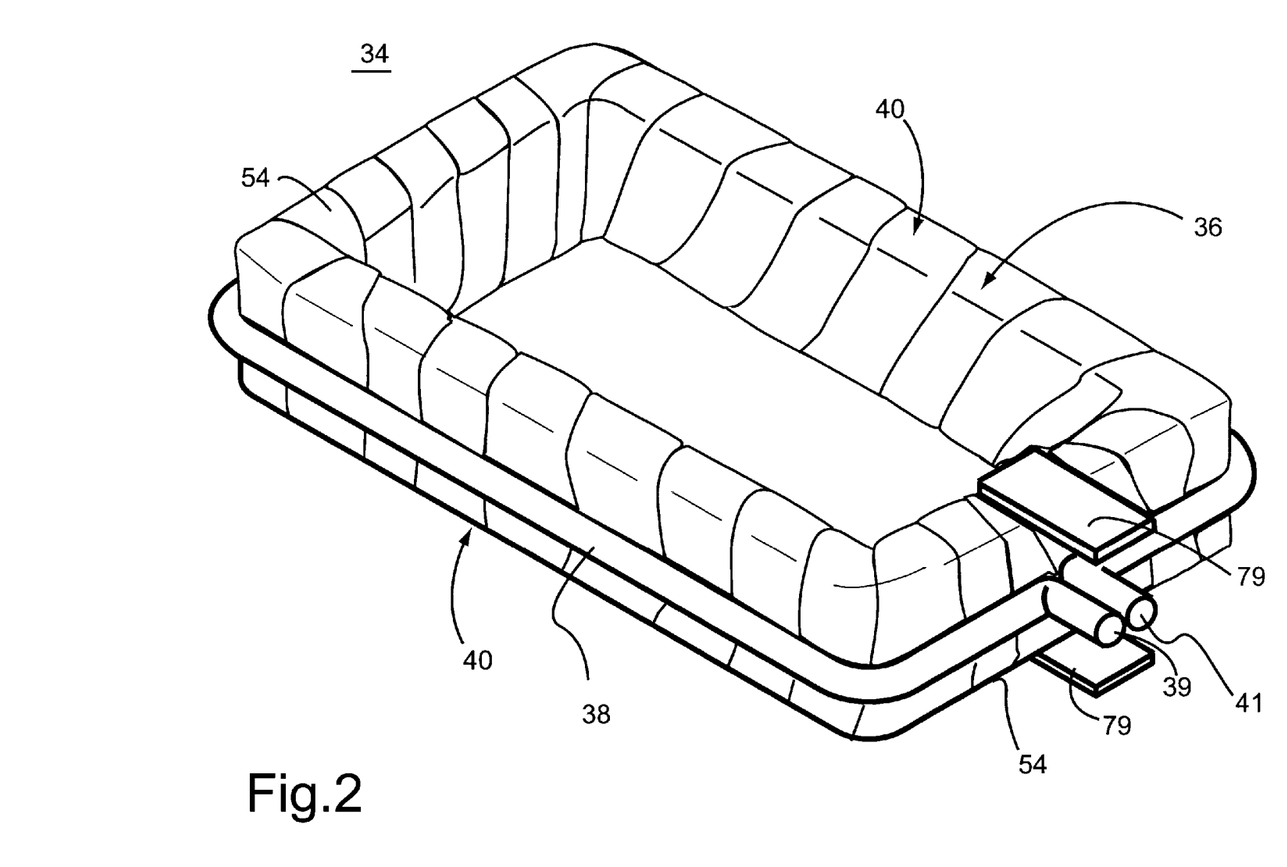
FIG. 2 is a perspective view of an exemplary race-track super-conducting coil winding.

The rotor 14 supports at least one longitudinally-extending, racetrack-shaped, high-temperature super-conducting (HTS) coil winding 34 (See FIG. 2). The HTS coil winding may be alternatively a saddle-shape or have some other shape that is suitable for a particular HTS rotor design. A coil support system is disclosed here for a race-track SC coil winding. The coil support system may be adapted for coil configurations other than a race-track coil mounted on a solid rotor core.

The rotor includes a pair of end shafts 24, 30 that bracket the core 22 and are supported by bearings 25. The collector end shaft 24 may include collector rings 78 for electrically connecting to the rotating SC coil winding. The collector end shaft also has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The drive end shaft 30 may be driven by a power turbine via drive coupling 32.

FIG. 2 shows an exemplary HTS race-track field coil winding 34. The SC field winding coils 34 of the rotor includes a high temperature super-conducting (SC) coil 36. Each SC coil includes a high temperature super-conducting conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

SC wire is brittle and easy to be damaged. The SC coil is typically layer wound SC tape that is epoxy impregnated. The SC tape is wrapped in a precision coil form to attain close dimensional tolerances. The tape is wound around in a helix to form the race-track SC coil 36.

The dimensions of the race-track coil are dependent on the dimensions of the rotor core. Generally, each race-track SC coil encircles the magnetic poles of the rotor core, and is parallel to the rotor axis. The coil windings are continuous around the racetrack. The SC coils form a resistance free electrical current path around the rotor core and between the magnetic poles of the core. The coil has electrical contacts 79 that electrically connect the coil to the collector 78.

Fluid passages 38 for cryogenic cooling fluid are included in the coil winding 34. These passages may extend around an outside edge of the SC coil 36. The passageways provide cryogenic cooling fluid to the coil and remove heat from the coil. The cooling fluid maintains the low temperatures, e.g., 27° K., in the SC coil winding needed to promote super-conducting conditions, including the absence of electrical resistance in the coil. The cooling passages have input and output fluid ports 39, 41 at one end of the rotor core. These fluid (gas) ports 39, 41 connect the cooling passages 38 on the SC coil to the cryogen transfer coupling 26.

Each HTS race-track coil winding 34 has a pair of generally straight side portions 40 parallel to a rotor axis 20, and a pair of end portions 54 that are perpendicular to the rotor axis. The side portions of the coil are subjected to the greatest centrifugal stresses. Accordingly, the side portions are supported by a coil support system that counteract the centrifugal forces that act on the coil.

Figure 3:
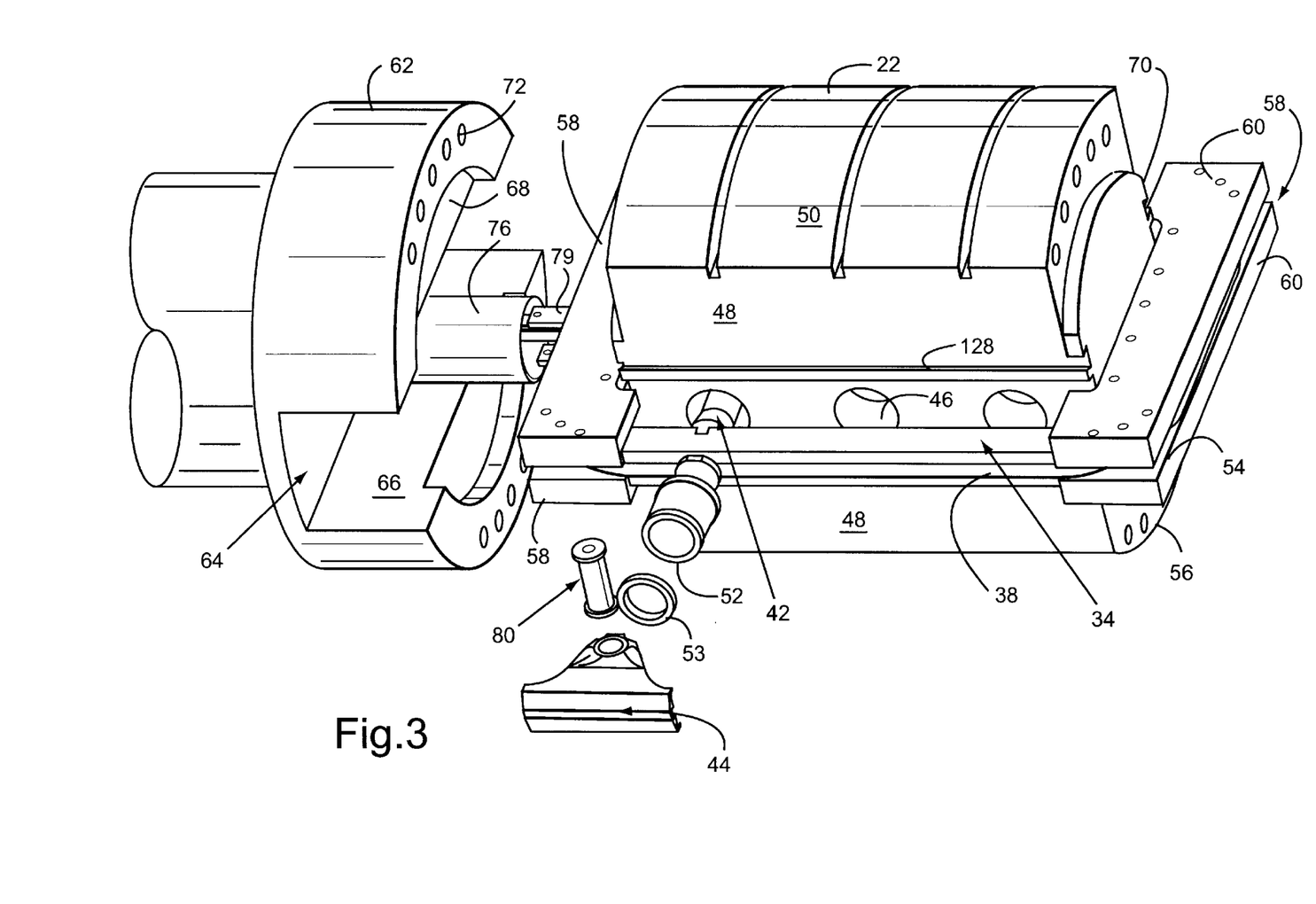
FIGS. 3 to 6 are exploded views of the components of a high temperature super-conducting (HTS) rotor.

FIG. 3 shows an exploded view of a rotor core 22 and coil support system for a high temperature super-conducting coil. The support system includes tension rods 42 connected to U-shaped channel housings. The housings hold and support the side portions 40 of the coil winding 34 in the rotor. While one tension rod and channel housing is shown in FIG. 3, the coil support system will generally include a series of tension rods that each have coil support housings 44 at both ends of the rod. The tension rods and channel housings prevent damage to the coil winding during rotor operation, support the coil winding with respect to centrifugal and other forces, and provide a protective shield for the coil winding.

The principal loading of the HTS coil winding 34 in an iron core rotor is from centrifugal acceleration during rotor rotation. An effective coil structural support is needed to counteract the centrifugal forces. The coil support is needed especially along the side sections 40 of the coil that experience the most centrifugal acceleration. To support the side sections of the coil, the tension rods 42 span between the sections of the coil and attach to the housings 44 that grasp opposite side sections of the coil. The tension rods extend through conduits 46, e.g., apertures, in the rotor core so that the rods may span between side sections of the same coil or between adjacent coils.

The conduits 46 are generally cylindrical passages in the rotor core having a straight axis. The diameter of the conduits is substantially constant, except at their ends near the recessed surfaces of the rotor. At their ends, the conduits may expand to a larger diameter to accommodate a non-conducting cylindrical tube 52 that provides slidable bearing surface and thermal isolation between the rotor core and the tension rod.

The axes of the conduits 46 are generally in a plane defined by the race-track coil. In addition, the axes of the conduits are perpendicular to the side sections of the coil to which are connected the tension rods that extends through the conduits. Moreover, the conduits are orthogonal to and intersect the rotor axis, in the embodiment shown here. The number of conduits and the location of the conduits will depend on the location of the HTS coils and the number of coil housings (see FIGS. 3 and 4) needed to support the side sections of the coils.

The tension rods support the coil especially well with respect to centrifugal forces as the rods extend substantially radially between the sides of the coil winding. Each tension rod is a shaft with continuity along the longitudinal direction of the rod and in the plane of the race-track coil. The longitudinal continuity of the tension rods provides lateral stiffness to the coils which provides rotor dynamics benefits. Moreover, the lateral stiffness permits integrating the coil support with the coils so that the coil can be assembled with the coil support prior to final rotor assembly. Pre-assembly of the coil and coil support reduces production cycle, improves coil support quality, and reduces coil assembly variations. The race-track coil is supported by an array of tension members that span the long sides of the coil. The tension rod coil support members are pre-assembled to coil.

The HTS coil winding and structural support components are at cryogenic temperature. In contrast, the rotor core is at ambient "hot" temperature. The coil supports are potential sources of thermal conduction that would allow heat to reach the HTS coils from the rotor core. The rotor becomes hot during operation. As the coils are to be held in super-cooled conditions, heat conduction into the coils is to be avoided. The rods extend through apertures, e.g., conduits, in the rotor but are not in contact with the rotor. This lack of contact avoids the conduction of heat from the rotor to the tension rods and coils.

To reduce the heat leaking away from the coil, the coil support is minimized to reduce the thermal conduction through support from heat sources such as the rotor core. There are generally two categories of support for superconducting winding: (i) "warm" supports and (ii) "cold" supports. In a warm support, the supporting structures are thermally isolated from the cooled SC windings. With warm supports, most of the mechanical load of a super-conducting (SC) coil is supported by structural members spanning from cold to warm members.

In a cold support system, the support system is at or near the cold cryogenic temperature of the SC coils. In cold supports, most of the mechanical load of a SC coil is supported by structural members which are at or near a cryogenic temperature. The exemplary coil support system disclosed here is a cold support in that the tension rods and associated housings that couple the tension rods to the SC coil windings are maintained at or near a cryogenic temperature. Because the supporting members are cold, these members are thermally isolated, e.g., by the non-contact conduits through the rotor core, from other "hot" components of the rotor.

An individual support member consists of a tension rod 42 (which may be a bar and a pair of bolts at either end of the bar), a coil housing 44, and a dowel pin 80 that connects the housing to the end of the tension rod. Each housing 44 is a U-shaped bracket having legs that connect to a tension rod and a channel to receive the coil winding 34. The U-shaped channel housing allows for the precise and convenient assembly of the support system for the coil. A series of coil housings may be positioned end-to-end along the side of the coil winding. The coil housings collectively distribute the forces that act on the coil, e.g., centrifugal forces, over substantially the entire side sections 40 of each coil.

The coil housings 44 prevent the side sections 40 of the coils from excessive flexing and bending due to centrifugal forces. The coil supports do not restrict the coils from longitudinal thermal expansion and contraction that occur during normal start/stop operation of the gas turbine. In particular, thermal expansion is primarily directed along the length of the side sections. Thus, the side sections of the coil slide slightly longitudinally with respect to the channel housing and tension rods.

The transfer of the centrifugal load from the coil structure to a support rod is through the coil housing that fits around the coil outside surface and side straight sections, and is doweled by pins 80 to a wide diameter end of the tension rod 42. The U-shaped housings 44 are formed of a light, high strength material that is ductile at cryogenic temperatures. Typical materials for channel housing are aluminum, Inconel, or titanium alloys, which are non-magnetic. The shape of the U-shaped housing may be optimized for low weight and strength.

The dowel pin 80 extends through apertures in the channel housing and tension rod. The dowel may be hollow for low weight. Locking nuts (not shown) are threaded or attached at the ends of the dowel pin to secure the U-shaped housing and prevent the sides of the housing from spreading apart under load. The dowel pin can be made of high strength Inconel or titanium alloys. The tension rods are made with larger diameter ends (not shown) that are machined with two flats (not shown) at their ends to fit the U-shaped housing and coil width. The flat ends of the tension rods abut the inside surface of the HTS coils, when the rod, coil and housing are assembled together. This assembly reduces the stress concentration at the hole in the tension rod that receives the dowel.

The coil support system of tension rods 42, coil housings 44 and split-clamp 58 may be assembled with the HTS coil windings 34 as both are mounted on the rotor core 22. The tension rods, housings and clamp provide a fairly rigid structure for supporting the coil windings and holding the coil windings in place with respect to the rotor core.

Each tension rod 42 extends through the rotor core, and may extend orthogonally through the axis 20 of the rotor. Conduits 46 through the rotor core provide a passage through which extend the tension rods. The diameter of the conduits is sufficiently large to avoid having the hot rotor walls of the conduits be in contact with the cold tension rods. The avoidance of contact improves the thermal isolation between the tension rods and the rotor core.

The rotor core 22 is typically made of magnetic material such as iron, while the rotor end shafts are typically made of non-magnetic material such as stainless steel. The rotor core and end shafts are typically discrete components that are assembled and securely joined together by either bolting or welding.

The iron rotor core 22 has a generally cylindrical shape 50 suitable for rotation within the rotor cavity 16 of the stator 12. To receive the coil winding, the rotor core has recessed surfaces 48, such as flat or triangular regions or slots. These surfaces 48 are formed in the curved surface of the cylindrical core and extending longitudinally across the rotor core. The coil winding 34 is mounted on the rotor adjacent the recessed areas 48. The coils generally extend longitudinally along an outer surface of the recessed area and around the ends of the rotor core. The recessed surfaces 48 of the rotor core receive the coil winding. The shape of the recessed area conforms to the coil winding. For example, if the coil winding has a saddle-shape or some other shape, the recess(es) in the rotor core would be configured to receive the shape of the winding.

The recessed surfaces 48 receive the coil winding such that the outer-surface of the coil winding extend to substantially an envelope defined by the rotation of the rotor. The outer curved surfaces 50 of the rotor core when rotated define a cylindrical envelope. This rotation envelope of the rotor has substantially the same diameter as the rotor cavity 16 (see FIG. 1) in the stator.

The gap between the rotor envelope and stator cavity 16 is a relatively-small clearance, as required for forced flow ventilation cooling of the stator only, since the rotor requires no ventilation cooling. It is desirable to minimize the clearance between the rotor and stator so as to increase the electromagnetic coupling between the rotor coil windings and the stator windings. Moreover, the rotor coil winding is preferably positioned such that it extends to the envelope formed by the rotor and, thus, is separated from the stator by only the clearance gap between the rotor and stator.

The end sections 54 of the coil winding 34 are adjacent opposite ends 56 of the rotor core. A split-clamp 58 holds each of the end sections of the coil windings in the rotor. The split clamp at each coil end 54 includes a pair of opposite plates 60 between which is sandwiched the coil winding 34. The surface of the clamp plates includes channels (not shown) to receive the coil winding and electrical connections 79 to the winding.

The split clamp 58 may be formed of a non-magnetic material, such as aluminum or Inconel alloys. The same or similar non-magnetic materials may be used to form the tension rods, coil housings and other portions of the coil support system. The coil support system is preferably non-magnetic so as to preserve ductility at cryogenic temperatures, since ferromagnetic materials become brittle at temperatures below the Curie transition temperature and cannot be used as load carrying structures.

The split clamp 58 is surrounded by, but is not in contact with collar 62. There is a collar 62 at each end of the rotor core 22, although only one collar is shown in FIG. 3. The collar is a thick disk of non-magnetic material, such as stainless steel, the same as or similar to the material, that forms the rotor shafts. Indeed, the collar is part of the rotor shaft. The collar has a slot 64 orthogonal to the rotor axis and sufficiently wide to receive and clear the split clamp 58. The hot side-walls 66 of the slot collar are spaced apart from the cold split clamp so they do not come in contact with each other.

The collar 62 may include a recessed disk area 68 (which is bisected by the slot 64) to receive a raised disk region 70 of the rotor core (see opposite side of rotor core for raised disk region to be inserted in opposite collar). The insertion of the raised disk region 70 on the end of the rotor core into the recessed disk 68 provides support to the rotor core in the collar, and assists in aligning the rotor core and collars. In addition, the collar may have a circular array of bolt holes 72 extending longitudinally through the collar and around the rim of the collar. These bolt holes correspond to matching threaded bolt holes 74 that extend partially through the rotor core. Threaded bolts 75 (see FIG. 5) extend through these longitudinal bolt holes 72, 74 and secure the collars to the rotor core.

The electrical and cooling fluid conduits are shielded by a thin walled tube 76 that extends along the rotor axis from one of the coil end sections 54 and through a collar 62. The cooling conduits in the tube 76 connect to the input and output ports 39, 41 of the cooling passage 38 on the coil winding to the cryogenic transfer coupling 26. An electrical coupling 79 to the coil is provided at same end section of the coil as the cooling coupling 26.

Figure 6:
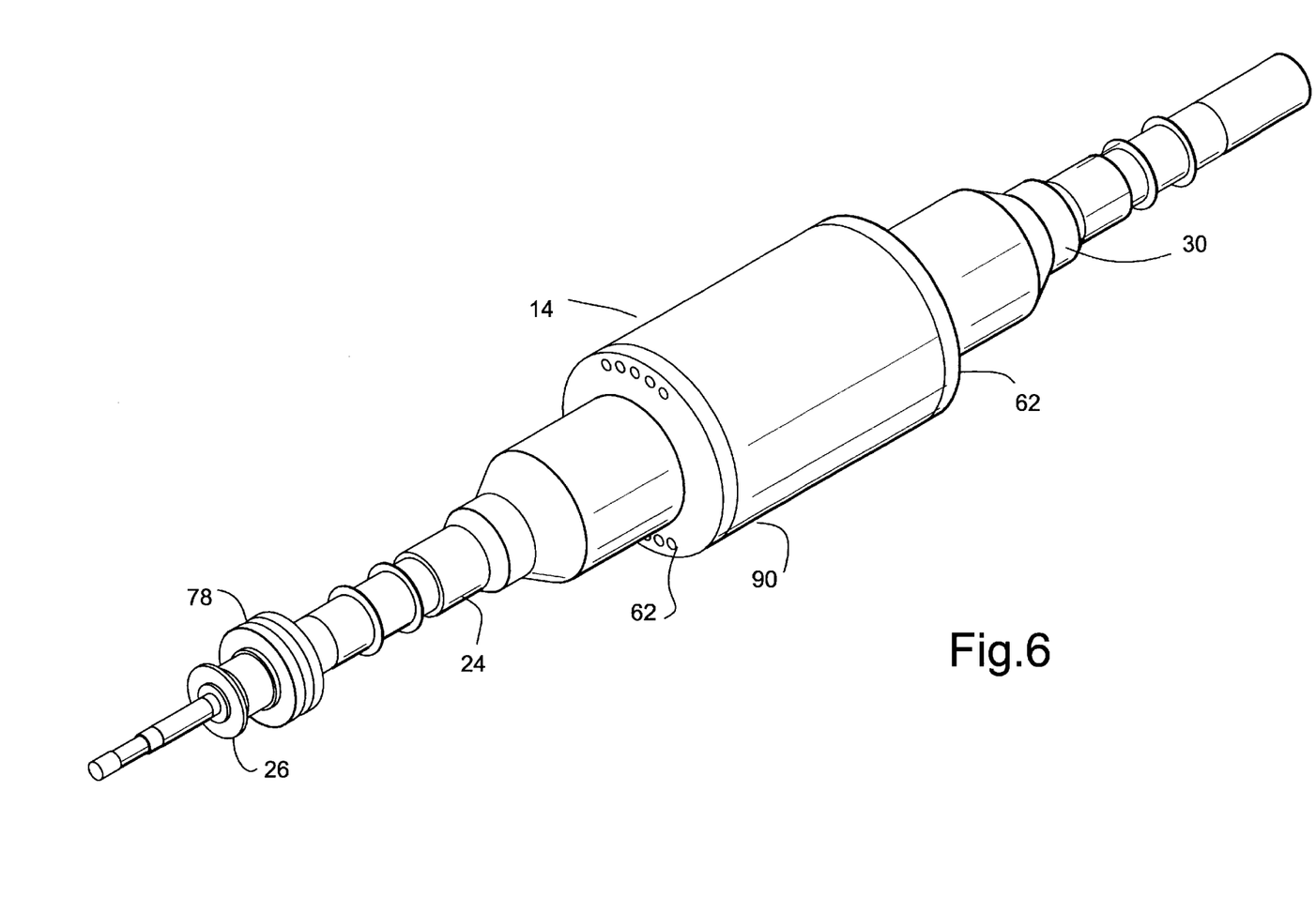
Figure 7:
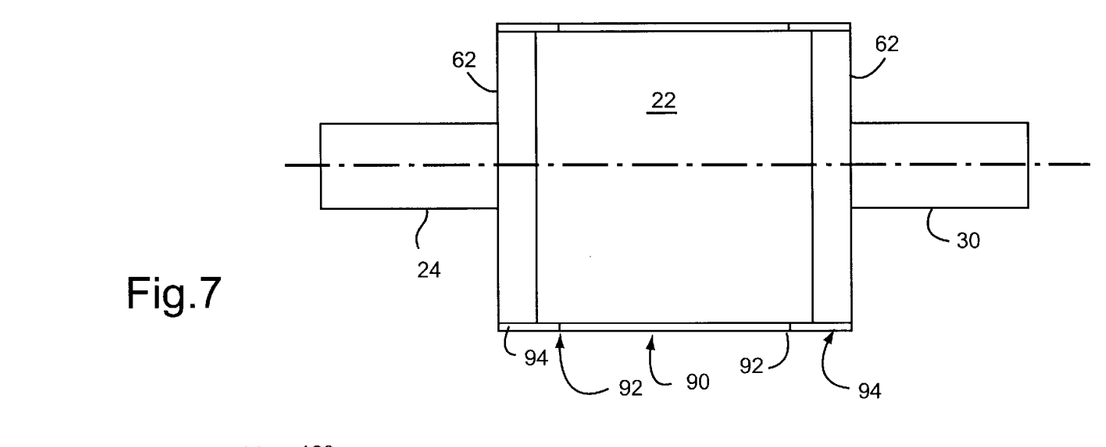
FIGS. 7 to 10 are cross-sectional views of different embodiments of electromagnetic shields for a rotor.

The rotor core may be encased in a metallic cylindrical shield 90, as shown in FIG. 6, that protects the super-conducting coil winding 34 from eddy currents and other electrical currents that surround the rotor and provides the vacuum envelope as required to maintain hard vacuum around the cryogenic components of the rotor. The cylindrical shield 90 may be formed of a highly conductive material, such as a copper alloy or aluminum.

The SC coil winding 34 is maintained in a vacuum. The vacuum may be formed by the shield 90 which may include a stainless steel cylindrical layer that forms a vacuum vessel around the coil and rotor core.

Figure 4:
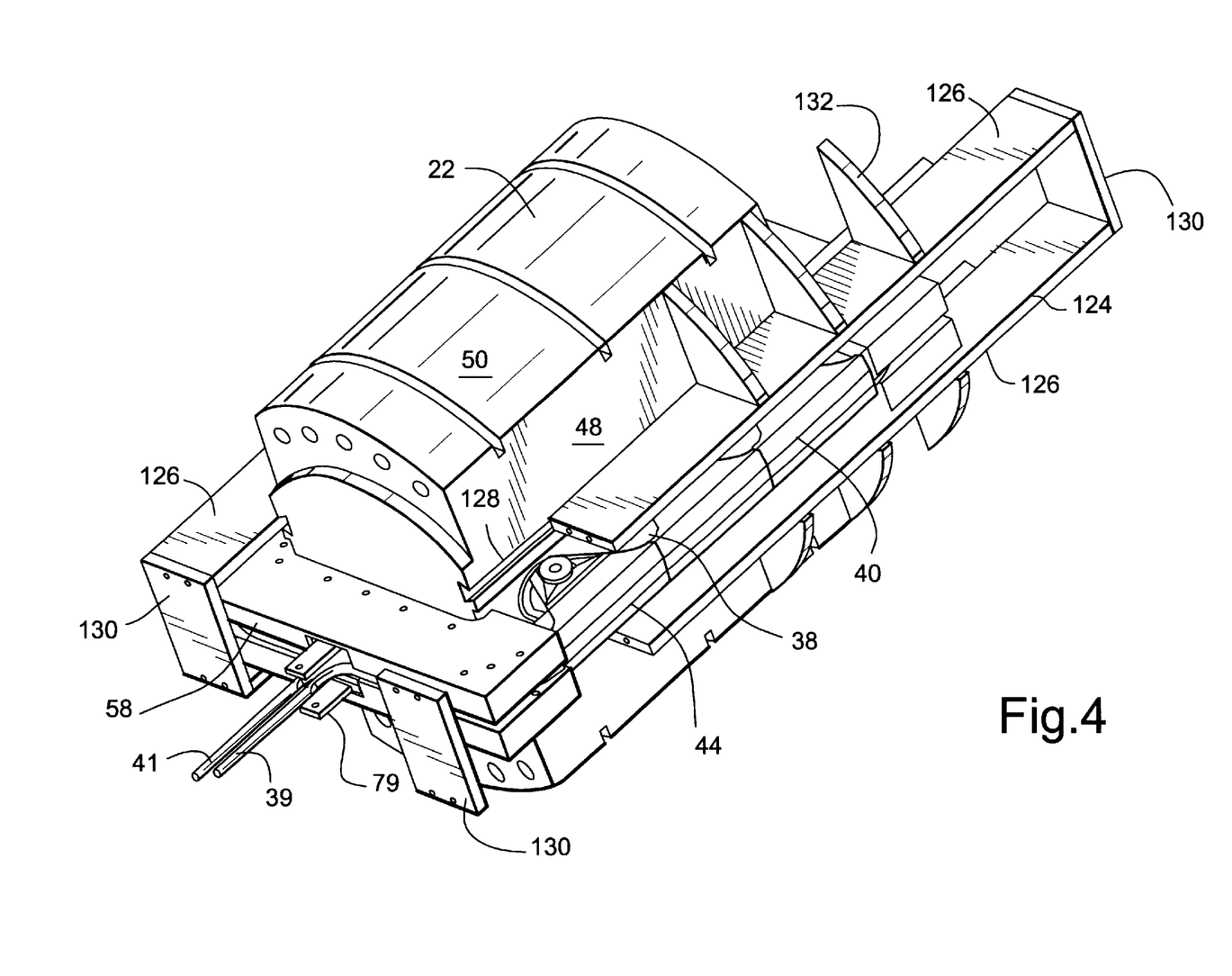
Figure 5:
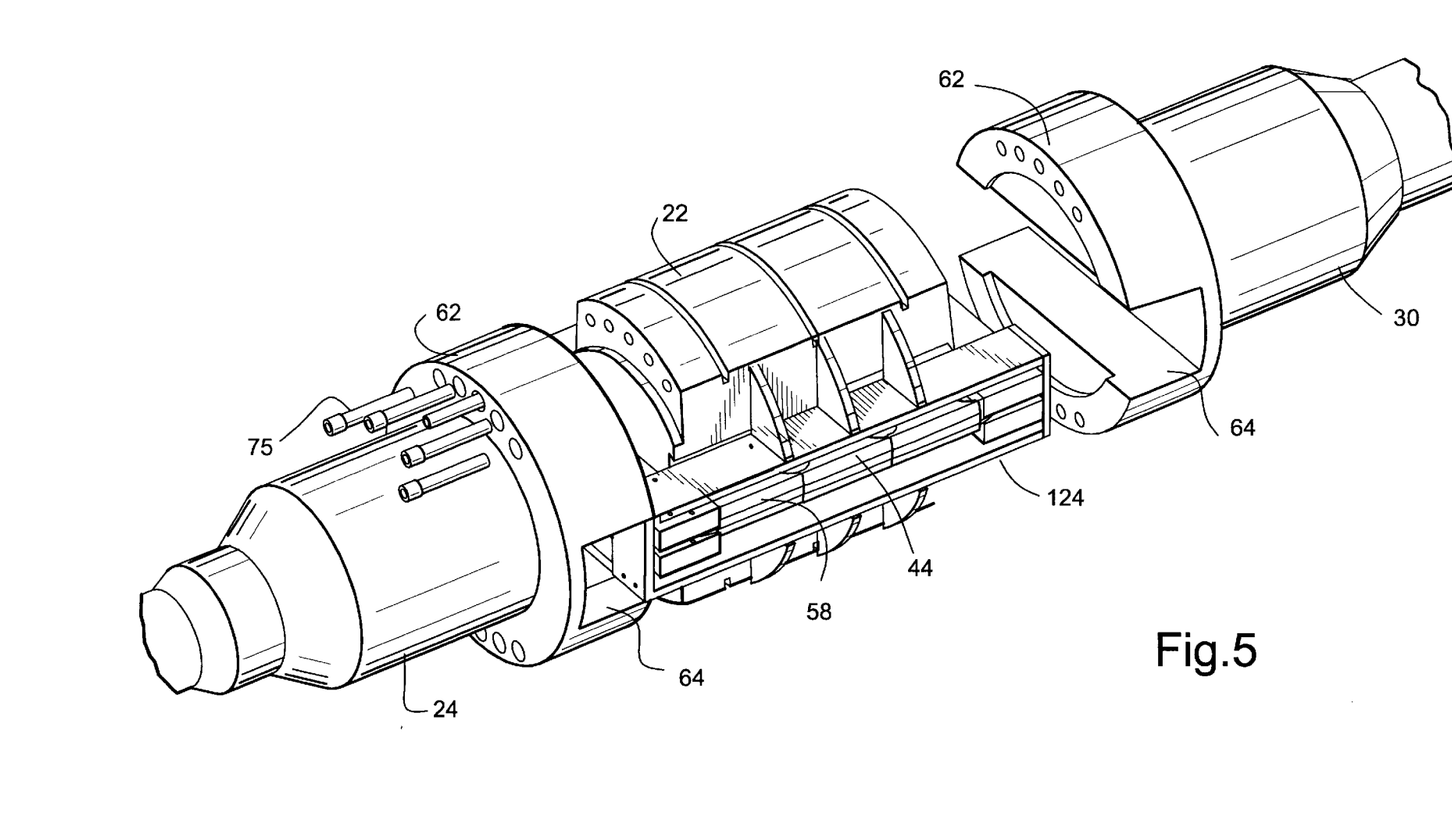

As own in FIGS. 4 and 5, a support bracket 124 is provided to assist the shield 90 withstand the large radial forces that can result when a grid fault condition occurs. The radial support may be a rectangular box 126, 130 that fits around the sides 40 of the coil winding and extends over the split-clamp 58. The support bracket include a pair of side walls 126 that are dovetailed into a slot 128 in the recessed surface 48. The side-walls and their ribs 132 extend from the rotor core surface 48 to the shell 90 and provides structural strength to the shell.

FIG. 7 to 10 are cross-sectional views of different embodiments of electromagnetic shields for a rotor. In a first embodiment shown in FIG. 7 of an electromagnetic (EM) shield the shield 90 is a cylindrical copper alloy that surrounds the rotor core 22. The ends of the shield are brazed to rings of stainless steel. The brazed joint between the copper shield and stainless steel rings may be furnace brazed. Alternatively, the braze may be a butt-braze or a scarf-joint braze. The stainless steel rings are attached, e.g., welded, to the collars of the rotor.

Figure 8:
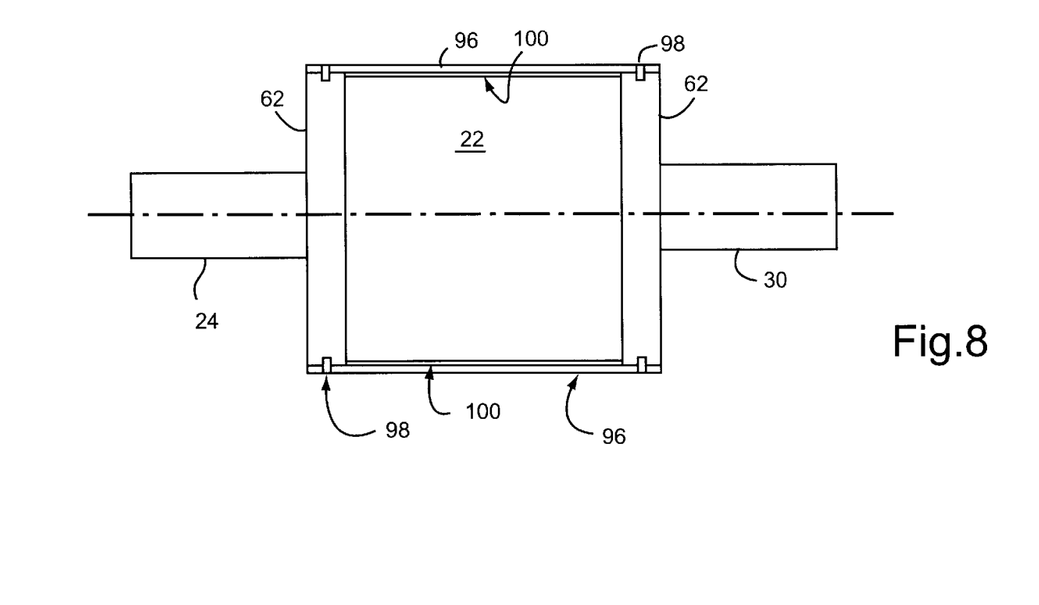

In a second embodiment shown in FIG. 8, a cylindrical copper shield 96 covers the rotor body and at least a portion of the pair of collars. The cooper shield 96 is attached to the collar, such as using bolts 98 to connect the shield to the collars. In addition, a stainless steel cylinder 100 is fitted inside the copper shield. The stainless steel cylinder forms a vacuum vessel around the rotor core and SC coil windings. The stainless steel vacuum vessel may be brazed to the cooper shield.

Figures 9, 10:
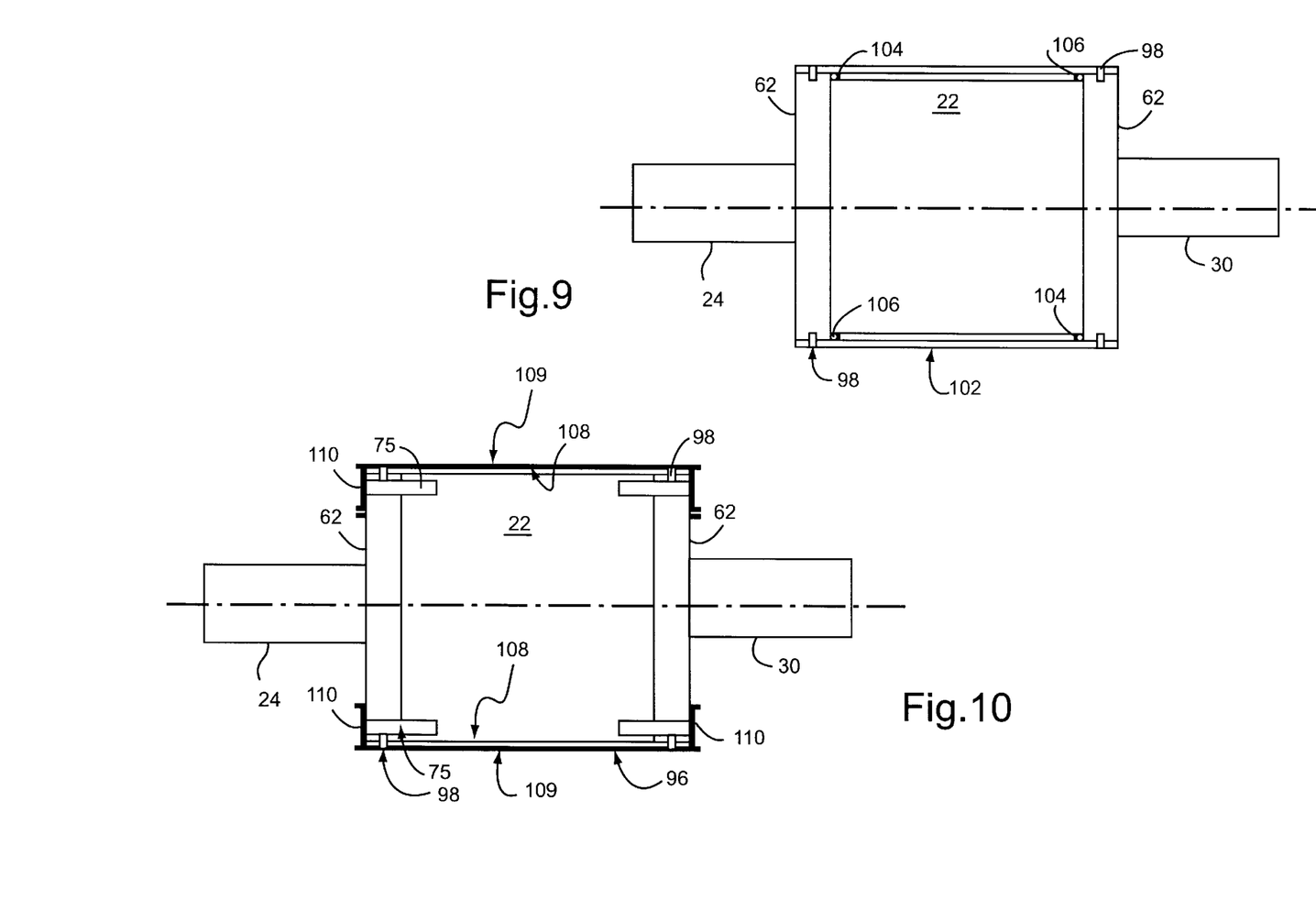

In a further EM shield embodiment shown in FIG. 9 the EM shield is a conductive cylinder 102 formed of a cooper alloy or aluminum. The cylinder provides an electromagnetic shield and serves as a vacuum vessel for the SC rotor coil winding. An inside surface of the shield may have annular rims 104 adjacent the edges of the collars. An elastic 0-ring 106 between the collar and rims provides an air-tight seal to maintain the vacuum around the rim. The shield may be bolted to the collar.

An external vacuum shield with an internal EM shield is shown in FIG. 10. A cylindrical copper alloy EM shield 108 surrounds the rotor 22 and collars 62. The EM shield may be fastened to the collars 62 with bolts 98. A cylindrical stainless steel vacuum vessel 109 surrounds the EM shield 108 and may be laminated to the outer surface of the EM shield.

The bolts 75 that attach the rotor core to the collars are a potential path for air leakage into the HTS rotor vacuum. To prevent such air leakage from entering the rotor via the bolts, a stainless steel vacuum shield 110 is welded over the bolt holes on the outside of the collars. These vacuum shields 110 are welded such that they can readily removed so as to extract the bolts and disassemble rotor. The vacuum shield for the rotor bolts may be a ring that covers the bolt holes in the collars.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. In a synchronous machine, a rotor comprising:
   a rotor core;
   rotor collars on opposite ends of the rotor core and axially aligned with the rotor core, wherein the rotor collars each have a slot adjacent an end of the rotor core and said slot receiving an end section of a super-conducting coil windings
   said super-conducting coil winding extending around at least a portion of the rotor core, said coil winding having a pair of coil side sections on opposite sides of said rotor core and a pair of coil end sections extending in said slot of each of said collars;
   a conductive shield around the rotor core and covering said coil winding, wherein said conductive shield extends over each of said collars and the shield is attached to the collars.

2. In a rotor as in claim 1 wherein said conductive shield is a cylinder coaxial to the rotor core and the collars.

3. In a rotor as in claim 1 wherein the conductive shield is formed of a copper alloy or aluminum.

4. In a rotor as in claim 1 further comprising a vacuum vessel laminated to the shield and surrounding the rotor core and said vacuum vessel extends over a portion of each of said collars and the vessel is attached to the collars.

5. In a rotor as in claim 1 wherein the shield is a cylinder around the rotor core and overlapping said collars, and said rotor further comprises a cylindrical vacuum vesselcoaxial with the shield and the collars.

6. In a rotor as in claim 5 wherein the vacuum vessel is stainless steel, and the shield is a copper alloy.

7. In a rotor as in claim 1 wherein each collar having a stainless steel ring coaxial with the rotor core, and said shield having circular ends and each end of the shield being attached to the ring at each of said collars.

8. In a rotor as in claim 1 wherein said shield is brazed to the collars.

9. A rotor for a synchronous machine comprising:
   a rotor core having a conduit orthogonal to a longitudinal axis of the rotor;
   a race-track super-conducting (SC) coil winding in a planar race-track shape parallel to the longitudinal axis of the rotor;
   a tension rod inside the conduit of the core and said tension rod extending between and attached to opposite sides of the SC coil winding;
   a housing coupling the coil winding to the tension rod, and
   a electromagnetic shield around the rotor core.

10. A rotor as in claim 9 wherein the shield is a copper cylinder around the core.

11. A rotor as in claim 9 further comprising a vacuum vessel around the core.

* * * * *

UNITED STATES PATENT AND TRADEMARK OFFICE
CERTIFICATE OF CORRECTION

PATENT NO.   : 6,590,305 B2
DATED        : July 8, 2003
INVENTOR(S)  : Yu Wang et al.

It is certified that error appears in the above-identified patent and that said Letters Patent is hereby corrected as shown below:

Column 9,
Line 60, kindly delete "own" and insert -- shown -- therefor.

Signed and Sealed this

Twenty-third Day of September, 2003

JAMES E. ROGAN
*Director of the United States Patent and Trademark Office*